US006295882B1

(12) United States Patent
Österberg

(10) Patent No.: US 6,295,882 B1

(45) Date of Patent: Oct. 2, 2001

(54) DEVICE FOR OPERATING DISPLAY MEMBERS AT SIGNS

(75) Inventor: Jonas Olof Österberg, Limhamn (SE)

(73) Assignee: Prisma World Sign AB, Malmo (SE)

(*) Notice: Subject to any disclaimer, the term of this patent is extended or adjusted under 35 U.S.C. 154(b) by 0 days.

(21) Appl. No.: 09/479,972

(22) Filed: Jan. 10, 2000

(30) Foreign Application Priority Data

Jan. 19, 1999 (SE) .................................................. 9900136

(51) Int. Cl.[7] ............................. F16H 27/08; G09F 11/02

(52) U.S. Cl. ........................... 74/84 R; 40/505; 74/411.5; 74/435; 74/665 GB

(58) Field of Search ..................... 40/504, 505; 74/84 R, 74/411.5, 435, 665 GB

(56) References Cited

U.S. PATENT DOCUMENTS

| | | | |
|---|---|---|---|
| 4,638,580 | 1/1987 | Giannetti . | |
| 5,161,421 | 11/1992 | Stigsson . | |
| 6,038,799 * | 3/2000 | Havens et al. | 40/505 |
| 6,128,841 * | 10/2000 | Werner | 40/505 |

FOREIGN PATENT DOCUMENTS

| | | |
|---|---|---|
| 0499324 | 8/1992 | (EP) . |
| 0501303 | 9/1992 | (EP) . |
| 466576 | 3/1991 | (SE) . |
| 9835173 | 8/1998 | (WO) . |

* cited by examiner

*Primary Examiner*—Allan D. Herrmann

(74) *Attorney, Agent, or Firm*—Tarolli, Sundheim, Covell, Tummino & Szabo L.L.P.

(57) ABSTRACT

In a device for operating display members (2) at signs for consecutive, repeated presentation of series of images, the members (2) are operated by a driving gear wheel (9) on a drive shaft (6) through a driven gear wheel (10) for each member (2). The drive shaft (6) has a lock (15) cooperating with a member (16) being non-rotatably connected with the driven gear wheel (10) for setting in a locking position for blocking the driven gear wheel (10) against rotation when no engagement between the gear wheels (9, 10) is present, and leaving its locking position for permitting rotation of the driven gear wheel (10) before engagement once again is present. The lock (15) comprises a first lock member (17) which in locking position cooperates with one of the side surfaces (18) on the non-rotatable member (16) for blocking the driven gear wheel (10) against rotation and preventing displacement of the gear wheels (9, 10) relative to each other in one direction along the longitudinal direction of the drive shaft (6), and at least one second lock member (19, 23, 24, 28) for at least preventing displacement of the gear wheels (9, 10) relative to each other in at least the opposite direction along the longitudinal direction of the drive shaft (6).

15 Claims, 5 Drawing Sheets

DEVICE FOR OPERATING DISPLAY MEMBERS AT SIGNS

FIELD OF THE INVENTION

The present invention relates to a driving device for driving or operating elongate display members at signs for consecutive, repeated presentation of series of images according to the preamble of claim 1.

BACKGROUND OF THE INVENTION

In many older driving devices for driving elongate display members of the above type, it has been necessary to carry out the driving with a motor which is programmed to stop each time the display members are standing still in their display positions. At e.g. trilateral, elongate display members, it has therefore been necessary to stop the motor three times during each revolution for displaying all three sides. Since signs for consecutive, repeated display or presentation of series of images are in continuous operation day and night throughout the year, the driving motor must be capable of performing an enormous number of starts and stops, thereby making heavy demands upon the motor and the control device therefor. This means, inter alia, that either expensive motor units must be used or frequent shutdowns must be allowed for.

Where the driving devices are constructed such that the motor can rotate continuously without stopping and starting, it has up to now been possible to eliminate in a satisfactory manner, the risk that the display members are dislodged in an impermissible manner during rotation or when standing still in their display positions. The display members can be brought "out of phase" by gusts of wind, heavy rain or other outer circumstances and shutdowns of the driving device can thereby occur.

It has until recently neither been possible, in driving devices which permit rotation of the elongate display members in one direction as well as the opposite direction, to at least substantially eliminate the risk for that said display members are rotated in an impermissible manner when they are standing still in their display positions.

However, by means of the driving device of SE, B, 466 576 it is ensured that one can use a driving motor which during the entire time of display rotates the drive shaft of the driving device continuously in one direction of rotation, i.e. completely without constantly starting and stopping the motor. It is also ensured that the display members can be blocked against rotation and not dislodged when standing still in their display positions. It will also be possible to operate the driving motor in the opposite direction if one wishes to rotate the display members in this opposite direction and the display members are even now prevented from being dislodged when they stand still.

BRIEF SUMMARY OF THE INVENTION

The object of the present invention is to improve the precision in and the effects of the locking function and thus, the function preventing dislodgement of the elongate display members, of the driving device of SE, B, 466 576. The object of the present invention is also to optimize the driving device for preventing displacement of the gear sector of the driving gear wheel and the driven gear wheel relative to each other in the longitudinal direction of the drive shaft and thus, deteriorate the driving engagement between the gear wheels, which also might lead to dislodgement of the elongate display members.

BRIEF DESCRIPTION OF THE DRAWINGS

The invention will be further described below with reference to the accompanying drawings, wherein.

DETAILED DESCRIPTION OF AN EMBODIMENT

Figure 1:
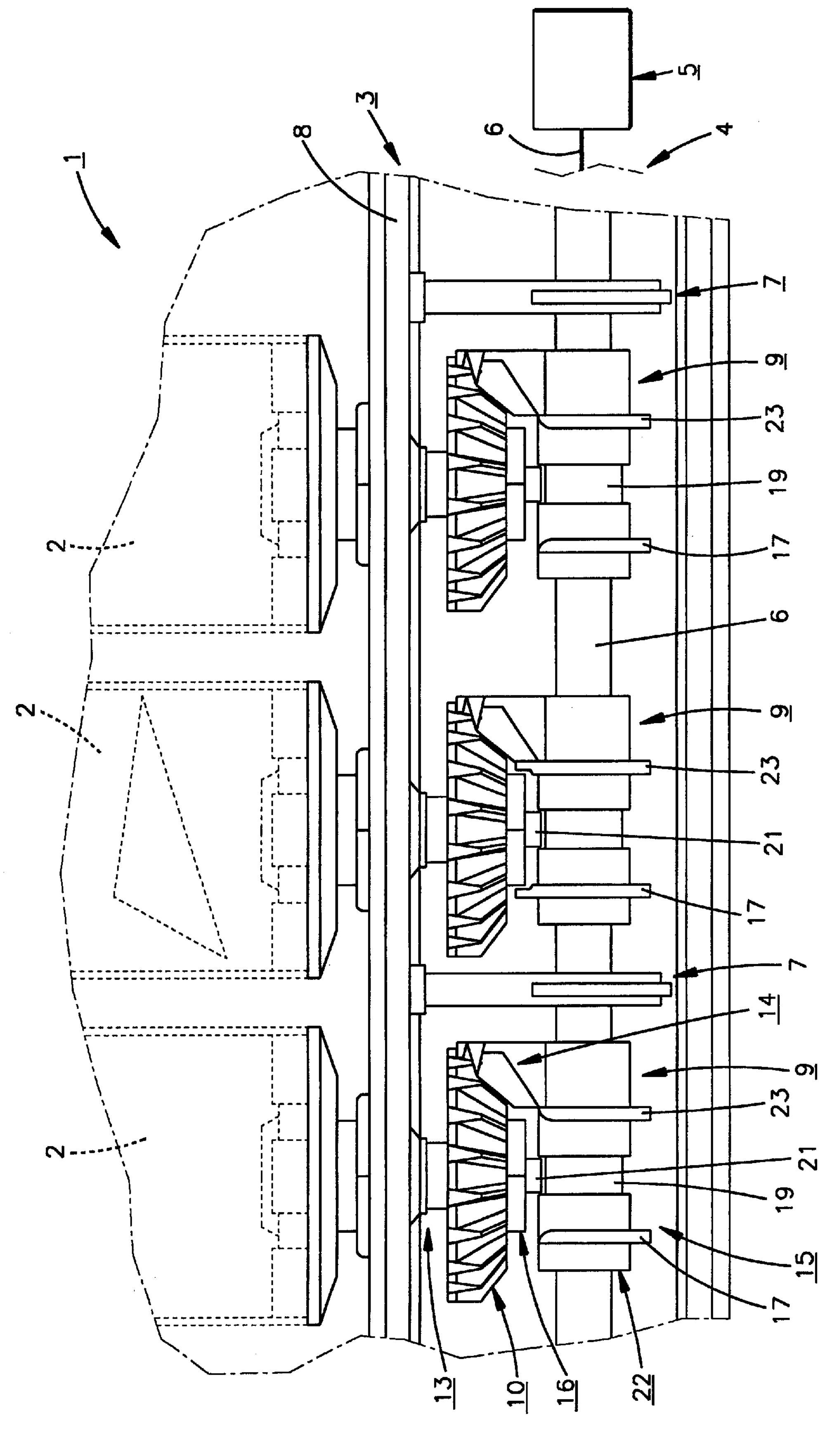
FIG. 1 is a schematic front view of a portion of a sign for consecutive, repeated presentation of series of images and provided with a first embodiment of a driving device according to the invention.

FIG. 1 illustrates a portion of a sign 1 for consecutive, repeated presentation of series of images, wherein all elongate display members 2 forming part of the sign are rotated either simultaneously for obtaining an effect where said display members at the same moment together define an image or wherein one starts to rotate one or more display members 2 in any part of the sign 1, whereafter successive display members located after each other are rotated for providing a successively growing or "rolling" sign 1.

Said sign 1 comprises a four side frame consisting of frame members of which only a lower frame member 3 is shown in FIG. 1. Essential parts of the driving device 4 is built into this lower frame member 3 and the elongate display members 2 are down below pivotally journalled in said frame member 3. The display members 2 are also, at the top, pivotally journalled in an upper frame member of said four side frame.

In the embodiment shown, the elongated display members 2 are trilateral, which has been indicated by dashed and dotted lines in one of the display members in FIG. 1 and the sign 1 is functioning such that a first side of all display members 2 together define an image, a second side of all display members together define a second image and a third side of all display members together define a third image. Said images are shown for a predetermined period of time depending on how long the display members stand still between successive images.

The driving device 4 comprises a driving unit 5, preferably an electric motor, schematically illustrated in FIG. 1 and mounted in a suitable manner on the frame or the lower frame member 3 thereof. The driving unit 5 operates a drive shaft 6 which is rotatably mounted in a suitable number of bearing elements 7 provided in the lower frame member 3. Each such bearing element 7 is preferably mounted in an upper shank 8 of said lower frame member 3.

The driving gear wheel 9 has a gear sector 14 which occupies only a portion of the periphery of said driving gear wheel, such that said gear wheel 9 engages the driven gear wheel 10 only during a part of a revolution of said driving gear wheel. This means that the driven gear wheel 10 and thereby the associated elongate display member 2 are rotated only during a part of a revolution of the driving gear wheel 9, while said driven gear wheel 10 and associated display member 2 stand still during the remaining part of the revolution of said driving gear wheel 9.

The driving gear wheel 9 has a gear sector 14 which occupies only a portion of the periphery of said driving gear wheel, such that said gear wheel 9 engages the driven gear wheel 10 only during a part of a revolution of said driving gear wheel. This means that the driven gear wheel 10 and thereby the associated elongate display member 2 are rotated only during a part of a revolution of the driving gear wheel 9, while said driven gear wheel 10 and associated display member 2 stand still during the remaining part of the revolution of said driving gear wheel 9.

In order to ensure that the driven gear wheel 10 and associated elongate display member 2 are not dislodged during rotation or when standing still, the drive shaft 6 has a lock means 15 which is provided to cooperate with a member 16 centered with the driven gear wheel 10 and non-rotatably connected therewith in such a manner that the driven gear wheel 10 is blocked against rotation during that part of a revolution of the driving gear wheel 9 the said gear sector 14 of said driving gear wheel 9 is not engaging the teeth 12 of the driven gear wheel 10.

The lock means 15 is preferably provided to block the driven gear wheel 10 against rotation when said driven gear wheel is rotated a part of a revolution by the driving gear wheel 9. Since the illustrated elongate display members 2 are trilateral and thus shall stand still three times during each revolution, the lock means 15 is in this embodiment provided to block the driven gear wheel 10 three times during each revolution, namely first in a first position and thereafter in a second position when the driving gear wheel 9 has rotated the driven gear wheel 10 120° and then again in a third position when said driving gear wheel 9 has rotated said driven gear wheel 10 another 120°.

Furthermore, the gear sector 14 of the driving gear wheel 9 preferably occupies such part of the periphery of said driving gear wheel 9 that the driven gear wheel 10 during each revolution on the drive shaft 6 is rotated a number of degrees depending on the number of sides on the elongate display members 2 and/or depending on the number of sides on said display members to be displayed.

In the embodiments shown, the lock means 15 consists of a first lock means member in the shape of a cam disk 17 which is non-rotatably mounted on the drive shaft 6 and protrudes therefrom in radial direction. The member 16 non-rotatably connected with the driven gear wheel 10 has a number of side surfaces 18 for cooperation with the cam disk 17. The number of side surfaces 18 on said member 16 corresponds with the number of sides on the elongate display members 2 or is an integer multiple of the number of sides on said display members. In the drawings, said member 16 has six side surfaces 18. In the locking position (FIG. 3), the cam disk 17 cooperates with one of the side surfaces 18 on the member 16 non-rotatably connected with the driven gear wheel 10 such that said driven gear wheel is blocked against rotation and displacement of the gear sector 14 of the driving gear wheel 9 and the driven gear wheel 10 relative to each other in one direction along the longitudinal direction of the drive shaft 6 is prevented. With the cam disk 17 in locking position, the gear sector 14 of the driving gear wheel 9 is located in free or neutral position. On the other hand, the cam disk 17 is located in free or neutral position (FIGS. 1, 2 and 4) when the gear sector of the driving gear wheel is in driving position.

Figure 4:
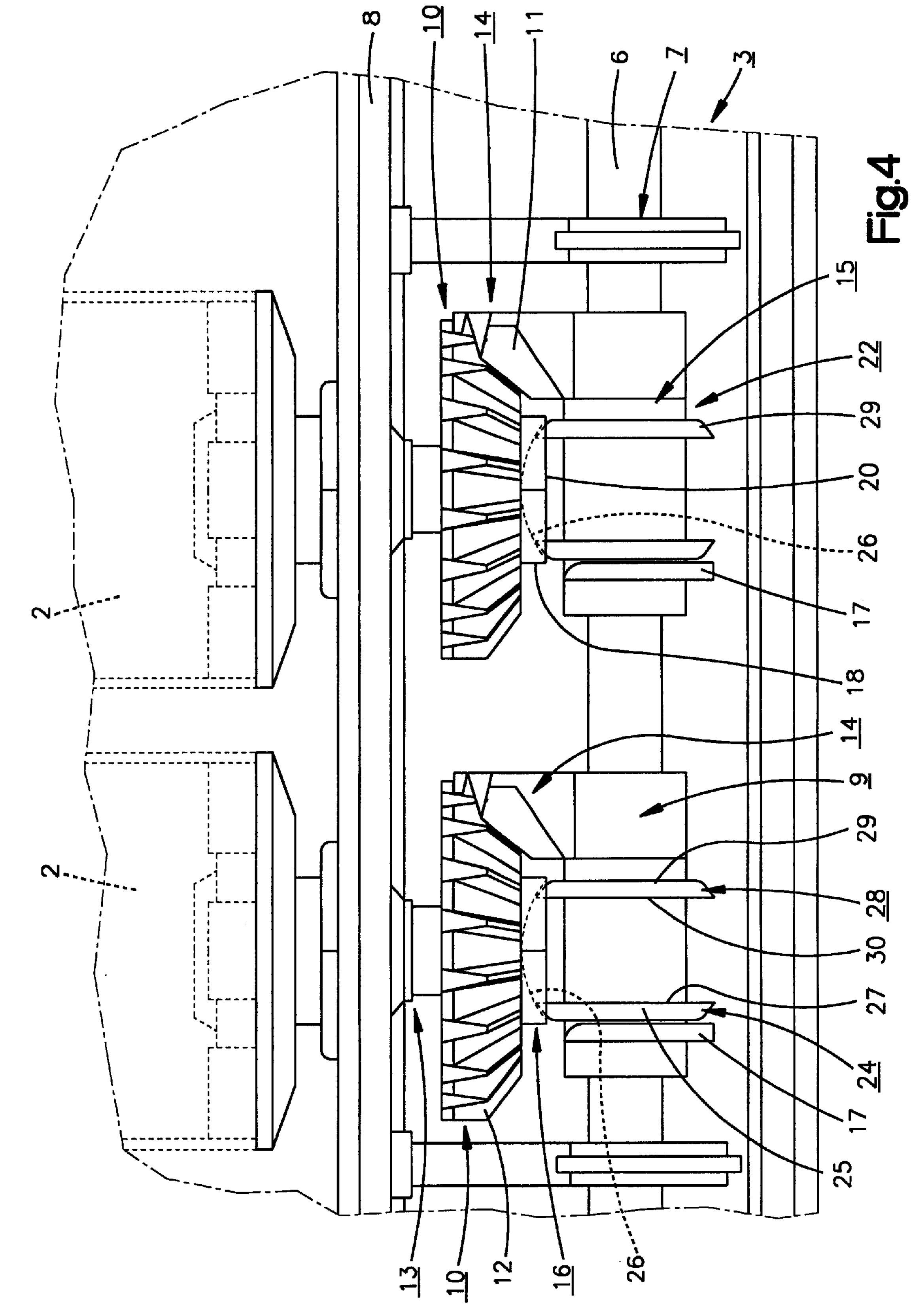
FIG. 4 is a schematic front view of a portion of a sign for consecutive, repeated presentation of series of images and provided with a second embodiment of a driving device according to the invention during a driving moment.
Figure 5:
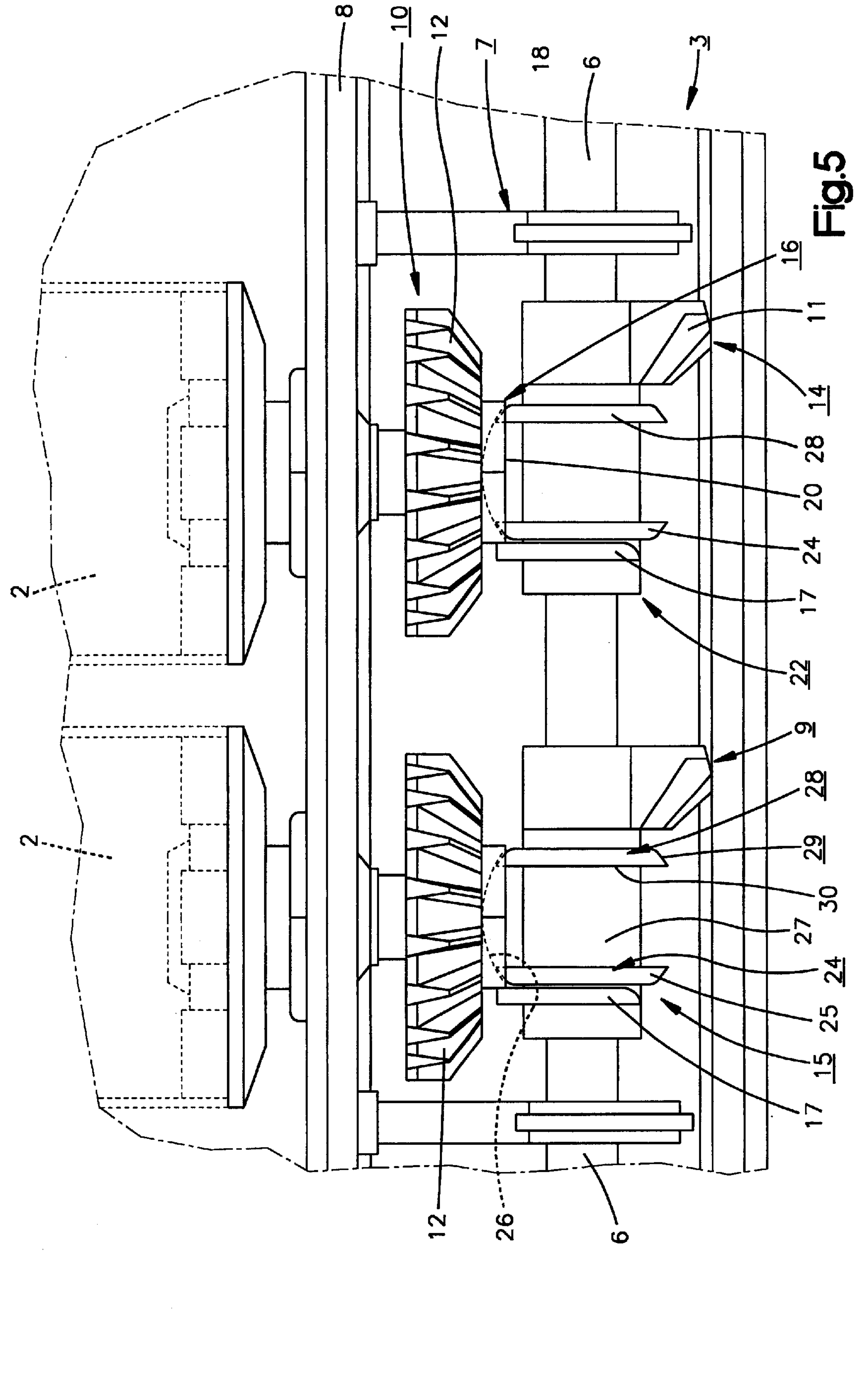
FIG. 5 is the same view as FIG. 4, but with the driving device during a locking moment.

The cam disk 17 may, as in FIGS. 4 and 5, be mounted on the opposite side of the member 16 non-rotatably connected with the driven gear wheel 10 as the driving gear wheel 9 and its gear sector 14, but the same locking function is obtained even if the cam disk 17 is provided on the same side of said non-rotatable member 16 as the gear sector 14 of the driving gear wheel 9. Displacement of the gear sector 14 of the driving gear wheel 9 and the driven gear wheel 10 relative to each other in different directions along the longitudinal direction of the drive shaft 6 depending on the location of the cam disk 17, is thereby prevented.

Preferably, the cam disk 17 is designed such that a portion thereof is lacking along that part of the periphery of the driving gear wheel 9 which constitutes the gear sector 14 (see the drawings), or is said cam disk 17 designed e.g. thinner along said part of the periphery of the driving gear wheel 9 (shown in FIGS. 1–3), such that rotation of the driven gear wheel 10 is permitted without said member 16 non-rotatably connected with the driven gear wheel coming in contact with the cam disk 17.

Except for the cam disk 17, the lock means 15 further comprises a second lock means member for preventing at least displacement of the gear sector 14 of the driving gear wheel 9 and the driven gear wheel 10 relative to each other in at least the opposite direction along the longitudinal direction of the drive shaft 6 as the cam disk 17. This lock means member may take a plurality of different shapes which can be used individually or in combination.

Figure 2:
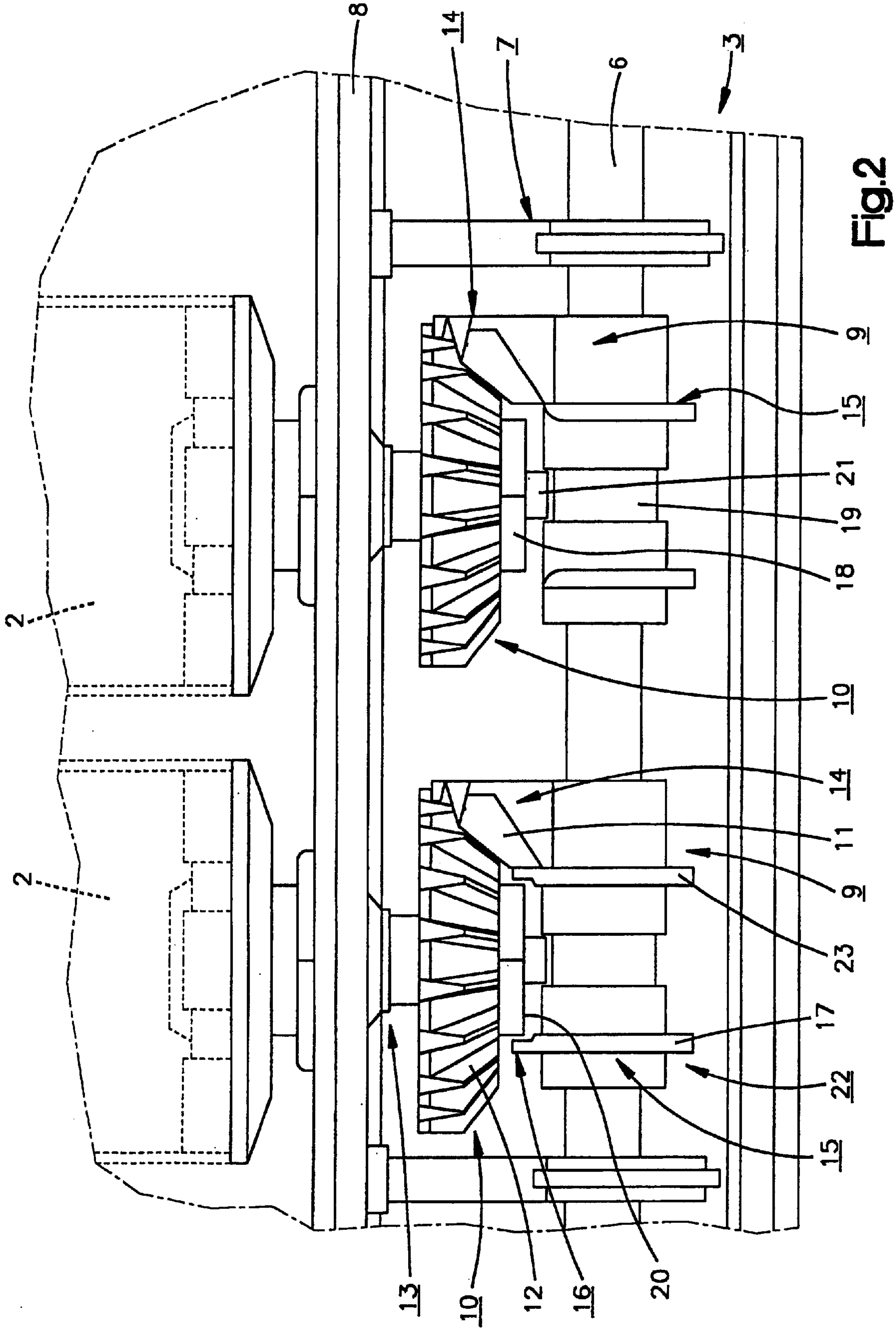
FIG. 2 is a schematic front view of a portion of the driving device of FIG. 1 during a driving moment.
Figure 3:
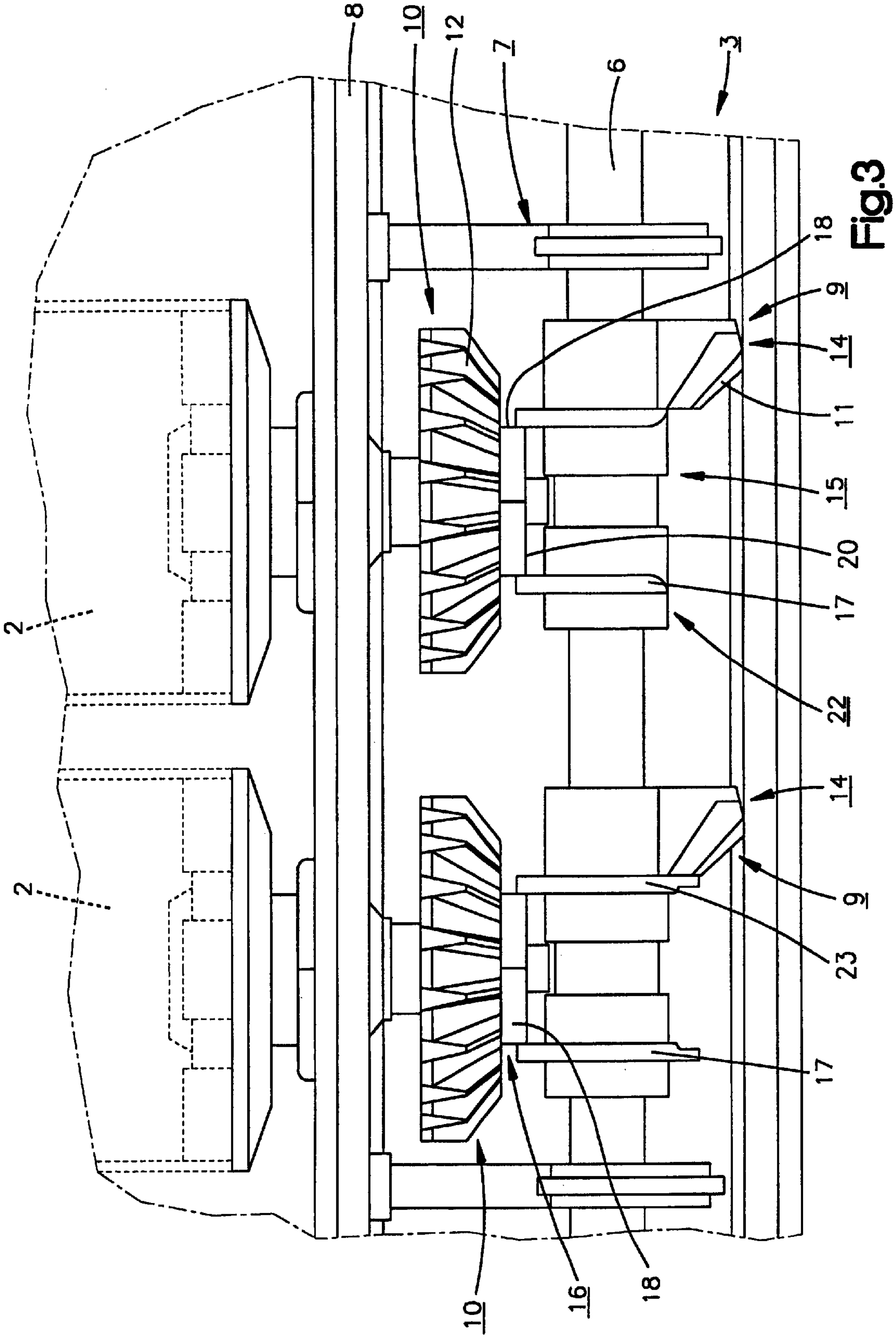
FIG. 3 is the same view as in FIG. 2, but with the driving device during a locking moment.

According to a first embodiment illustrated in FIGS. 1–3, said second lock means member is defined by a groove 19 extending peripherally around the drive shaft 6 and cooperating with a guide pin 21 protruding into said groove 19 and centered on the underside 20 of the member 16 non-rotatably connected with the driven gear wheel 10. The guide pin 21 is guided by the groove 19 such that the gear sector 14 of the driving gear wheel 9 and the driven gear wheel 10 are constantly held in a position preventing displacement thereof relative to each other in the longitudinal direction of the drive shaft 6, i.e. also when the gear wheels 9, 10 engage each other for rotation of the elongate display members 2. Since the gear wheels 9, 10 are prevented from displacement relative to each other as defined, the driving engagement between said gear wheels remains at an optimum. The groove 19 can be provided in the drive shaft 6 itself, but also in a somewhat thicker portion of the drive shaft opposite to the guide pin 21. This portion may be a unit 22 provided separately on the drive shaft 6 and which preferably also includes the cam disk 17 and eventual other present second lock means members.

Said second lock means member may consist of or alternatively also comprise a second cam disk 23 protruding radially from the drive shaft 6 (the right hand cam disk in FIGS. 1–3). The first cam disk 17 and said second cam disk 23 are located on opposite sides of the member 16 non-rotatably connected with the driven gear wheel 10 and are brought to cooperate with diametrically opposed side surfaces 18 thereon (see FIG. 3), such that the driven gear wheel 10 is blocked against rotation from two sides. At the same time, it is achieved as above that the gear sector 14 of the driving gear wheel 9 and the driven gear wheel 10 are held in a position preventing displacement thereof relative to each other in the longitudinal direction of the drive shaft 6. If in order to strength this effect a groove 19 for a guide pin 21 is also provided, this groove is located between the cam disks 17, 23 designed preferably as above in the drive shaft 6 or in said unit 22. As in embodiments with only one cam disk 17, there are, in embodiments with two cam disks 17, 23, portions of the cam disks lacking along that part of the periphery of the driving gear wheel 9 occupied by the gear sector 14 or are the cam disks 17, 23 designed e.g. thinner along said part of the periphery of the driving gear wheel 9

(FIGS. 1–3) such that rotation of the driven gear wheel 10 is allowed without the member 16 non-rotatably connected with the driven gear wheel 10 coming in contact with the cam disks 17, 23.

Said second lock means member may also consist of, alone or in combination with the abovementioned lock means members 19, 23, a guide flange 24 protruding radially from the drive shaft 6 and having, in embodiments with only one cam disk, a convexly curved, preferably substantially semi-spherical surface 25 facing the cam disk 17 defining said first lock means member and extending around the drive shaft 6. The surface 25 cooperates with a preferably substantially semi-spherical, downwards towards the drive shaft 6 open recess 26 (shown with broken lines in FIGS. 4 and 5) which is centered on the underside 20 of the member 16 non-rotatably connected with the driven gear wheel 10, whereby the gear sector 14 of the driving gear wheel 9 and the driven gear wheel 10 are held in a position preventing displacement thereof relative to each other in the longitudinal direction of the drive shaft 6. This is possible because the guide flange 24, due to its location, counteracts displacement in the opposite direction along the longitudinal direction of the drive shaft 6 as the cam disk 17. With an eventual guide pin 21 in the centre of the underside 20 of said non-rotatable member 16, and thus, in the centre of said recess 26, the groove 19 for the guide pin 21 is found on the opposite side of the guide flange 24 as the semi-spherical surface 25 thereof facing the cam disk 17. The side 27 of the guide flange 24 facing the groove 19 is preferably vertical and perpendicular to the drive shaft 6 and may define one side of said groove 19. From the above it is apparent that with the cam disk 17 on the same side of the member 16 non-rotatably connected with the driven gear wheel 10 as the gear sector 14 of the driving gear wheel 9, i.e. the right hand cam disk in FIGS. 1–3, the guide flange 24 is also located to the right, close to the cam disk 17, i.e. should in the embodiment of FIGS. 4 and 5 constitute the right hand guide flange. On the other hand, if the cam disk 17 is located on the opposite side of the member 16 non-rotatably connected with the driven gear wheel 10 as the gear sector 14 of the driving gear wheel 9, i.e. the left hand cam disk in FIGS. 1–3 and as the cam disk in FIGS. 4 and 5 respectively, the guide flange 24 is also located to the left close to the cam disk, i.e. should in the embodiment of FIGS. 4 and 5 constitute the left hand guide flange. In embodiments with two cam disks, the guide flange 24 may be located optionally closest to the left hand cam disk 17 in FIGS. 1–3 or to the right hand cam disk 23.

Instead of one guide flange as above, said second lock means member may, as in FIGS. 4 and 5, consist of or further comprise two guide flanges 24 and 28 protruding radially from the drive shaft 6 at a distance from each other. The guide flanges 24, 28 have convexly curved, preferably substantially semi-spherical surfaces 25 and 29 respectively, facing away from each other and extending around the drive shaft. These surfaces 25, 29 both cooperate with the substantially semi-spherical, downwards towards the drive shaft 6 open recess 26 which is centered on the underside 20 of the member 16 non-rotatably connected with the driven gear wheel 10. Again, it is hereby achieved, by means of the semi-spherical surfaces 25, 29 engaging the surface of the recess 26 in opposite directions along the longitudinal direction of the drive shaft 6, that the gear sector 14 of the driving gear wheel 9 and the driven gear wheel 10 also during rotation of the elongate display members 2 are prevented from relative displacement thereof. With an eventual guide pin 21 in the centre of the underside 20 of said non-rotatable member 16 and thus, also in the centre of said recess 26, the groove 19 for the guide pin 21 is located between the guide flanges 24, 28 and is either, as above, provided in the drive shaft 6 or in said unit 22 or defined by the vertical sides 27 and 30 respectively, of the guide flanges, perpendicular to the drive shaft 6 and facing each other.

Instead of two guide flanges as in FIGS. 4 and 5, said second lock means member may consist of or further comprise a guide flange (not shown) protruding radially from the drive shaft 6 and having preferably a substantially spherical, i.e. almost globular instead of a substantially semi-spherical surface extending around the drive shaft 6. This surface cooperates, as above, with the substantially semi-spherical, downwards towards the drive shaft 6 open recess 26, which is centered on the underside 20 of the member 16 non-rotatably connected with the driven gear wheel 10. The same effect preventing relative displacement of the gear sector 14 of the driving gear wheel 9, and the driven gear wheel 10, is hereby obtained as in the previous embodiments. As in the embodiments with the guide pin 21 in the groove 19 and with the two guide flanges 24, 28 respectively, this effect is constant, i.e. said displacement is prevented also when the gear wheels 9, 10 engage each other. With an eventual guide pin 21 in the centre of the underside 20 of said non-rotatable member 16, the groove 19 for the guide pin 21 is found in the spherical surface of the guide flange.

As indicated above, the gear sector 14 of the driving gear wheel 9 and the existing cam disk 17 are made in one piece, corresponding to the unit 22, together with eventual additional cam disk 23 and/or eventual guide flange or guide flanges 24, 28 and/or eventual groove 19 for the guide pin 21.

The gear sector 14 of the driving gear wheel 9 and the existing cam disk 17 are driven through the drive shaft 6 together with eventual additional cam disk 23 and/or eventual guide flange or guide flanges 24, 28 and/or eventual groove 19 for the guide pin 21 in one or the opposite direction of rotation or alternately in both directions of rotation for corresponding operation of the elongate display members 2 for consecutive, repeated presentation of series of images.

The driving device described above may besides what is stated above vary within the scope of the subsequent claims regarding its location and the design of the members forming part thereof. As examples of alternative designs of the driving device, it should be mentioned that the number of teeth on gear sector 14 and on the driven gear wheel 10 may be another than shown. Also, the driving device may be used for elongate display members 2 with another number of sides than three and it may be located in other ways than in a U-shaped frame member. Furthermore, the elongate display members need not be vertically oriented, but may instead be horizontally located.

What is claimed is:

1. A driving device for operating signs for consecutive, repeated presentation of a series of images, the driving device comprising:

elongate display members (2) operated through pairs of gear wheels (9, 10), the gear wheels (9, 10) having conical teeth (11 and 12 respectively);

a driving gear wheel (9) in each pair of gear wheels, the driving gear wheels being mounted on a drive shaft (6); and a driven gear wheel (10) in each pair of gear wheels (9, 10), the driven gear wheel (10) being operatively connected with the elongate display members (2), the driving gear wheel (9) having a gear sector (14) occupying a periphery of the driving gear wheel (9) such that, during each revolution of the drive shaft (6), the driving gear wheel (9) is rotated a number of degrees depending on the number of sides of the elongate display members (2), the drive shaft (6) having a lock means (15) provided to cooperate with a member (16) centered with the driven gear wheel (10) and non-rotatably connected with the driven gear wheel (10), the lock means (16) being located in a locking position for blocking the driven gear wheel (10) against rotation immediately after the gear sector (14) of the driving gear wheel (9) is no longer engaging the driven gear wheel (10), the lock means (16) leaving the locking position for permitting rotation of the driven gear wheel (10) just before the gear sector (14) of the driving gear wheel (9) engages the driven gear wheel (10), the lock means (15) comprising a first lock means member in the shape of a cam disk (17) protruding radially from the drive shaft (6), the member (16) having a number of side surfaces (18) for cooperation with the cam disk (17), the number of side surfaces (18) on the member (16) being directly proportional to the number of sides on the elongate display members (2), the cam disk (17), in the locking position, cooperating with one of the side surfaces (18) on the member (16) such that the driven gear wheel (10) is blocked against rotation and displacement of the gear sector (14) of the driving gear wheel (9) and the driven gear wheel (10) relative to each other in a first direction along the longitudinal direction of the drive shaft (6), the lock means (15) further comprising at least one second lock means member (19, 23, 24, 28) for at least preventing displacement of the gear sector (14) of the driving gear wheel (9) and the driven gear wheel (10) relative to each other in at least a second direction opposite the first direction along the longitudinal direction of the drive shaft (6).

2. The driving device according to claim 1 wherein the cam disk (17) is provided on the same side of the member (16) as the gear sector (14) of the driving gear wheel (9).

3. The driving device according to claim 1 wherein the cam disk (17) is located on the opposite side of the member (16) as the gear sector (14) of the driving gear wheel (9).

4. The driving device according to claim 1 wherein a portion of the cam disk (17) is lacking along that part of the periphery of the driving gear wheel (9) which constitutes the gear sector (14) such that rotation of the driven gear wheel (10) is permitted without said member (16) coming in contact with the cam disk (17).

5. Driving device according to claim 1 wherein the second lock means member comprises a groove (19) extending peripherally around the drive shaft (6) and cooperating with a guide pin (21) protruding into the groove (19), the groove (19) being centered on the underside (20) of the member (16), the guide pin (21) being guided by the groove (19) such that the gear sector (14) of the driving gear wheel (9) and the driven gear wheel (10) are held in a position preventing displacement thereof relative to each other in the longitudinal direction of the drive shaft (6).

6. The driving device according to claim 1 wherein the second lock means member comprises a second cam disk (23) protruding radially from the drive shaft (6), the cam disks (17, 23) being located on opposite sides of the member (16) and cooperating with diametrically opposed side surfaces (18) on the member (16) such that the driven gear wheel (10) is blocked against rotation from two sides while simultaneously the gear sector (14) of the driving gear wheel (9) and the driven gear wheel (10) are held in a position preventing displacement thereof relative to each other in the longitudinal direction of the drive shaft (6).

7. The driving device according to claim 6 wherein portions of the cam disks (17, 23) are lacking along a part of the periphery of the driving gear wheel (9) which is occupied by the gear sector (14) such that rotation of the driven gear wheel (10) is allowed without the member (16) coming in contact with the cam disks (17, 23).

8. The driving device according claim 1 wherein the second lock means member comprises a guide flange (24) protruding radially from the drive shaft (6) and having a convexly curved, semi-spherical surface (25) facing the cam disk (17) and extending around the drive shaft (6), said surface (25) cooperating with a semi-spherical, downwardly extending open recess (26) which is centered on the underside (20) of the member (16) whereby the gear sector (14) of the driving gear wheel (9) and the driven gear wheel (10) are held in position preventing displacement thereof relative to each other in the longitudinal direction of the drive shaft (6).

9. The driving device according to claim 8 wherein the groove (19) for the guide pin (21) is provided on the opposite side of the guide flange (24) as the semi-spherical surface (25).

10. The driving device according to claim 16 wherein the second lock means member comprises two guide flanges (24 and 28) protruding radially from the drive shaft (6) at a distance from each other, the guide flanges (24, 28) having convexly curved, semi-spherical surfaces (25 and 29 respectively), the surfaces 25 and 29) facing away from each other and extending around the drive shaft (6), the surfaces (25, 29) cooperating with a semi-spherical, downwardly extending open recess (26) which is centered on the underside (20) of the member (16) such that the gear sector (14) of the driving gear wheel (9) and the driven gear wheel (10) are held in a position preventing relative displacement thereof in the longitudinal direction of the drive shaft (6).

11. The driving device according to claim 10 wherein the groove (19) for the guide pin (21) is located between the guide flanges (24, 28).

12. The driving device according to claim 1 wherein the second lock means member comprises a guide flange protruding radially from the drive shaft (6) and having a spherical surface extending around the drive shaft (6), the surface cooperating with a semi-spherical, downwardly extending open recess (26) which is centered on the underside (20) of the member (16) such that the gear sector (14) of the driving gear wheel (9) and the driven gear wheel (10) are held in a position preventing displacement thereof relative to each other in the longitudinal direction of the drive shaft (6).

13. The driving device according to claim 12 wherein the groove (19) for the guide pin (21) is provided in the spherical surface (25) of the guide flange (24).

14. The driving device according to claim 1 wherein the gear sector (14) of the driving gear wheel (9) and the cam disk (17) are made in one piece (22) together with an additional cam disk (23).

15. The driving device according to claim 1 wherein the gear sector (14) of the driving gear wheel (9) and the cam disk (17) are driven through the drive shaft (6) together with the additional cam disk (23).

* * * * *

UNITED STATES PATENT AND TRADEMARK OFFICE
CERTIFICATE OF CORRECTION

PATENT NO. : 6,295,882 B1
DATED : October 2, 2001
INVENTOR(S) : Jonas Olof Osterberg It is certified that error appears in the above-identified patent and that said Letters Patent is hereby corrected as shown below:

Column 8,
Line 28, change "16" to -- 1 --.

Signed and Sealed this

Twenty-first Day of May, 2002

Attest:

JAMES E. ROGAN
*Director of the United States Patent and Trademark Office*

*Attesting Officer*